US012664087B2

(12) United States Patent
Kang et al.

(10) Patent No.: US 12,664,087 B2
(45) Date of Patent: Jun. 23, 2026

(54) MEMORY DEVICE, CXL MEMORY DEVICE, SYSTEM IN PACKAGE, AND SYSTEM ON CHIP INCLUDING HIGH BANDWIDTH MEMORY

(71) Applicant: SAMSUNG ELECTRONICS CO., LTD., Suwon-si (KR)

(72) Inventors: Mingoo Kang, Suwon-si (KR); Joonyoung Chang, Suwon-si (KR); Sungcheol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/898,068

(22) Filed: Sep. 26, 2024

(65) Prior Publication Data

US 2025/0103488 A1     Mar. 27, 2025

(30) Foreign Application Priority Data

Sep. 27, 2023   (KR) ......................... 10-2023-0131175
Mar. 8, 2024   (KR) ......................... 10-2024-0033323

(51) Int. Cl.
*G06F 12/00*        (2006.01)
*G06F 12/02*        (2006.01)
(52) U.S. Cl.
CPC ................................ *G06F 12/0246* (2013.01)
(58) Field of Classification Search
CPC .............. G06F 12/0246; G06F 13/1668; G06F 13/4282; G06F 15/7807; G06F 2213/0026
USPC ......................................................... 711/103
See application file for complete search history.

(56) References Cited

U.S. PATENT DOCUMENTS

| | | | |
|---|---|---|---|
| 10,784,121 | B2 | 9/2020 | Camarota |
| 11,500,797 | B2 | 11/2022 | Horwich et al. |
| 11,561,911 | B2 | 1/2023 | Norman et al. |
| 11,694,940 | B1 | 7/2023 | Mathuriya et al. |
| 2019/0138680 | A1* | 5/2019 | Teh .................. H03K 19/17796 |
| 2019/0220566 | A1* | 7/2019 | Tang ...................... G06F 13/20 |
| 2022/0148627 | A1 | 5/2022 | Meade et al. |
| 2022/0334995 | A1 | 10/2022 | Das Sharma et al. |
| 2023/0042856 | A1 | 2/2023 | Kim et al. |

(Continued)

FOREIGN PATENT DOCUMENTS

| | | |
|---|---|---|
| WO | 2021/173572 A1 | 9/2021 |
| WO | 2021/243340 A1 | 12/2021 |
| WO | 2022/177573 A1 | 8/2022 |

OTHER PUBLICATIONS

RAMBUS HBM Subsystem more than Doubles HNM2E Speed, Aug. 16, 2021 (Year: 2021).*

(Continued)

*Primary Examiner* — Mardochee Chery
(74) *Attorney, Agent, or Firm* — Sughrue Mion, PLLC

(57) ABSTRACT

A compute express link (CXL) memory device may include a high bandwidth memory (HBM) comprising a CXL base die and a plurality of core dies that are sequentially stacked on the CXL base die. The CXL base die may include an HBM interface intellectual property (IP) core configured to convert data transmission and reception between the plurality of core dies and dynamic random access memory (DRAM) in compliance with a CXL specification, and the HBM interface IP core corresponds to a non-Joint Electron Device Engineering Council (JEDEC) standard.

17 Claims, 16 Drawing Sheets

(56)        References Cited

U.S. PATENT DOCUMENTS

| 2023/0114164 A1 | 4/2023 | Pal et al. |
| 2023/0153587 A1 | 5/2023 | Vogelsang et al. |
| 2023/0350795 A1* | 11/2023 | Liu .................... G06F 12/0223 |

OTHER PUBLICATIONS

High Bandwidth Memory.*
Communication dated Feb. 14, 2025 issued by the European Patent Office in European Patent Application No. 24202578.1.
Anonymous, "Mastering DDR-PHY Interoperability via DEI", Sep. 5, 2016, (Sep. 5, 2016), XP093245778, Sunnyvale, CA, USA Retrieved from the Internets RL:https://www.synopsys.com/blogs/chip-design/mastering-ddr-phyinteroperability-dfi.html, pp. 1-8 (8 pages total).
Hongshin Jun et al., "HBM (High Bandwidth Memory) DRAM Technology and Architecture", 2017 IEEE International Memory Workshop (IMW), IEEE, May 14, 2017 (May 14, 2017), XP033104973,DOI: 10.1109/IMW.2017.7939084 [retrieved on Jun. 5, 2017], pp. 1-4, (4 pages total).
Communication dated Dec. 11, 2025, issued by the European Patent Office in European Application No. 24202578.1.

\* cited by examiner

FIG. 4

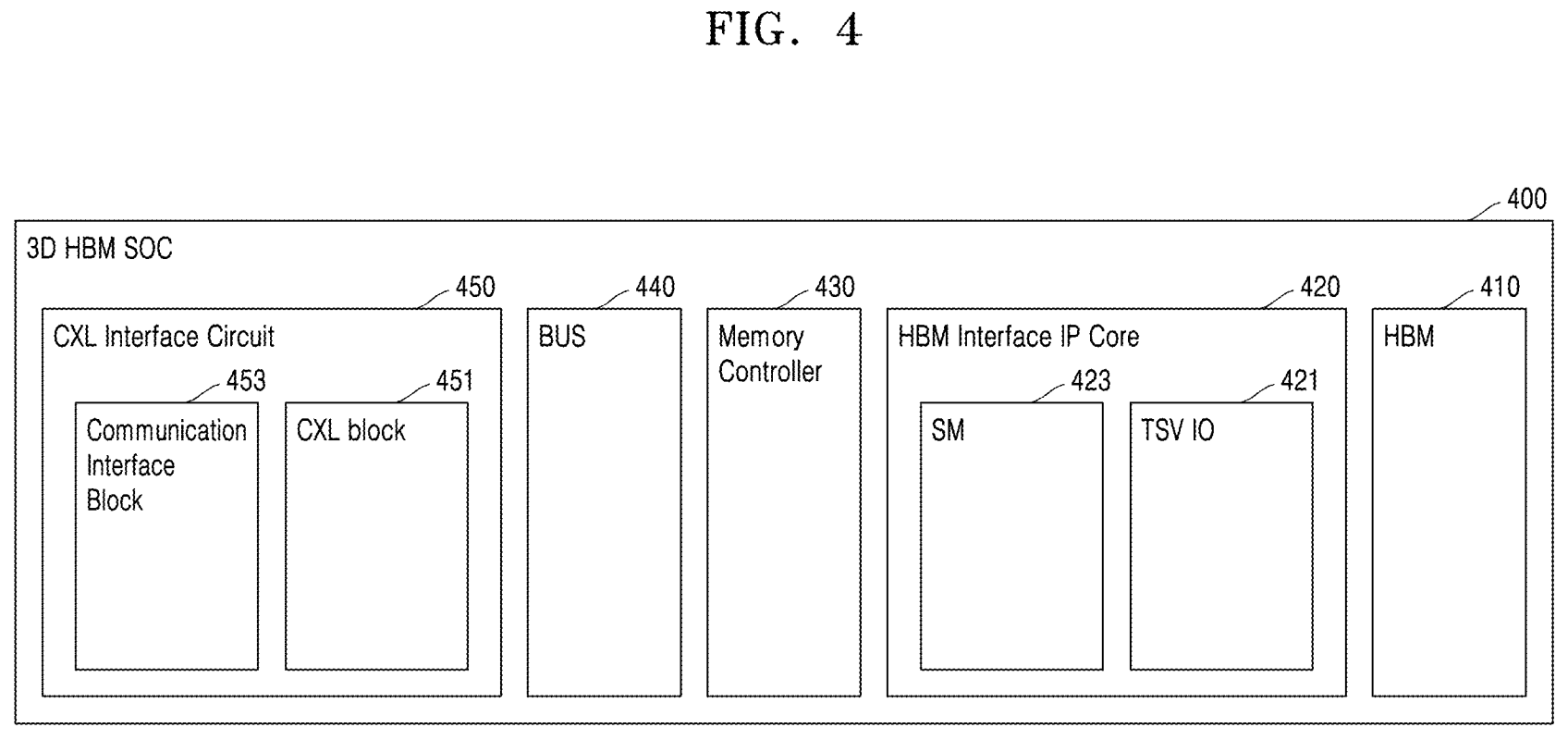

3D HBM SOC — 400

HBM — 410

HBM Interface IP Core — 420
SM — 423
TSV IO — 421

Memory Controller — 430

BUS — 440

CXL Interface Circuit — 450
Communication Interface Block — 453
CXL block — 451

Figure 5:
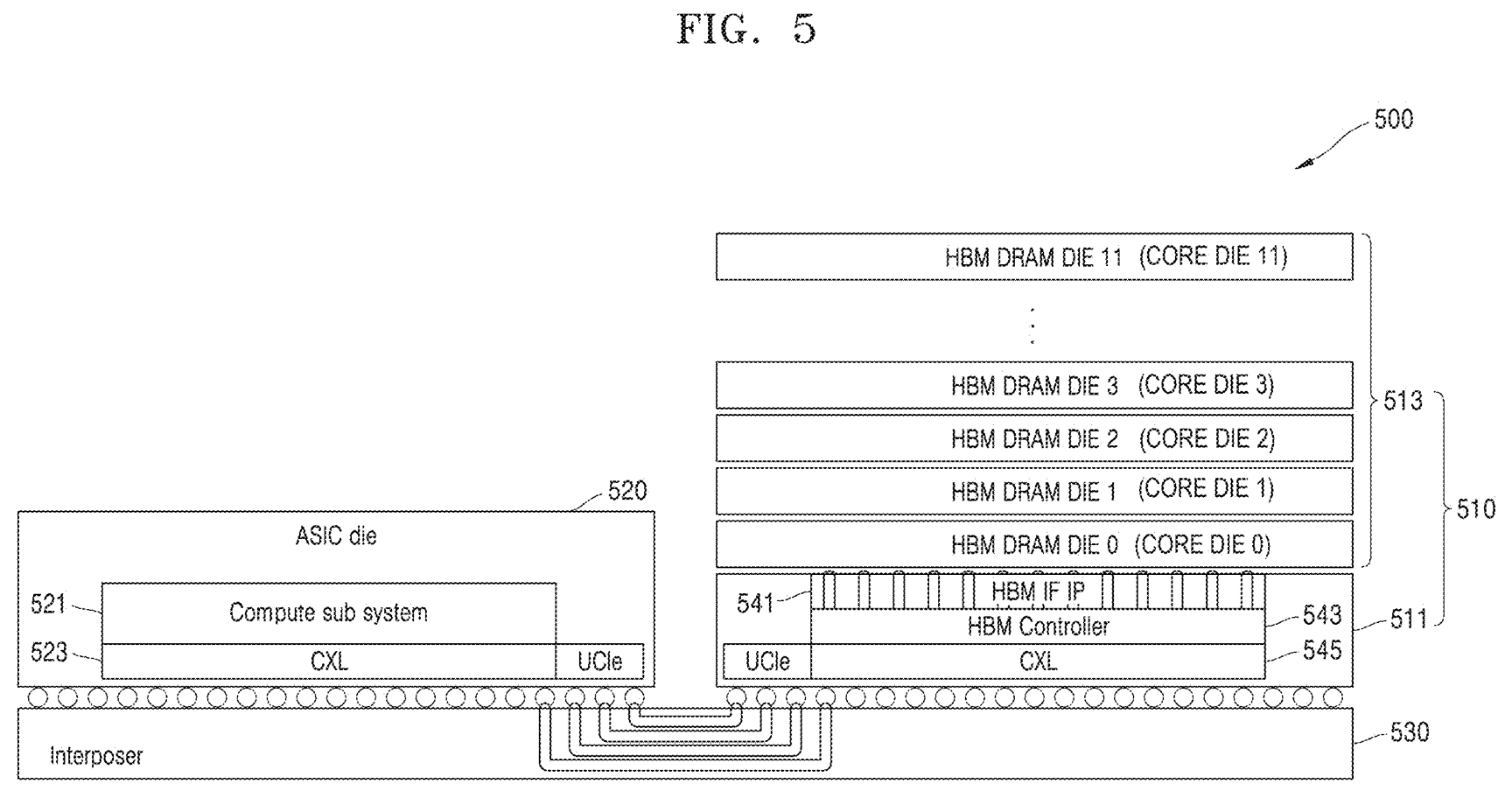

HBM DRAM DIE 11  (CORE DIE 11)

HBM DRAM DIE 3  (CORE DIE 3)

HBM DRAM DIE 2  (CORE DIE 2)

HBM DRAM DIE 1  (CORE DIE 1)

HBM DRAM DIE 0  (CORE DIE 0)

511

543

545

HBM IF IP

HBM Controller

CXL

541

UCIe

520

ASIC die

521  Compute sub system

523  CXL

UCIe

530

Interposer

FIG. 6A

| HBM DRAM DIE 11 |
|:---:|

.
.
.

| HBM DRAM DIE 3 |
|:---:|

| HBM DRAM DIE 2 |
|:---:|

| HBM DRAM DIE 1 |
|:---:|

| HBM DRAM DIE 0 |
|:---:|

| CXL Base Die |
|:---:|

931 First NPU

932 Second NPU

903 Low-latency CXL HBM

904 Low-latency CXL HBM

905 Low-latency CXL HBM

906 Low-latency CXL HBM

MEMORY DEVICE, CXL MEMORY DEVICE, SYSTEM IN PACKAGE, AND SYSTEM ON CHIP INCLUDING HIGH BANDWIDTH MEMORY

CROSS-REFERENCE TO RELATED APPLICATION

This application is based on and claims priority under 35 U.S.C. § 119 to Korean Patent Application Nos. 10-2023-0131175, filed on Sep. 27, 2023, and 10-2024-0033323, filed on Mar. 8, 2024, in the Korean Intellectual Property Office, the disclosures of which are incorporated by reference herein in their entireties.

BACKGROUND

Apparatuses, methods, and systems consistent with example embodiments of the present application relate to a memory device, a compute express link (CXL) memory device, a system in package, and a system on chip, and more particularly, to a memory device, a CXL memory device, a system in package, and a system on chip including a high bandwidth memory (HBM).

An apparatus configured to process data may perform various operations by accessing a memory. For example, the apparatus may process data read from the memory and write the processed data to the memory. According to the performance and functions required for a system, various apparatuses mutually communicating through a link that provides a high bandwidth and a low latency may be included in the system. A memory included in the system may be shared and accessed by two or more apparatuses. Accordingly, the performance of the system may depend on not only the operating speed of each apparatus but also the communication efficiency between apparatuses and the time taken to access the memory.

SUMMARY

One or more embodiments of the present disclosure provide a memory system, a memory device, and a method of operating the memory system and the memory device for a reduced latency.

According to an aspect of the present disclosure, a compute express link (CXL) memory device may include: a high bandwidth memory (HBM) including a CXL base die and a plurality of core dies that are sequentially stacked on the CXL base die, wherein the CXL base die may include: an HMB interface intellectual property (IP) core configured to convert data transmission and reception between the plurality of core dies and dynamic random access memory (DRAM) in compliance with a CXL specification, and the HMB interface IP core corresponds to a non-Joint Electron Device Engineering Council (JEDEC) standard.

According to another aspect of the present disclosure, a system-in-package (SiP) may include: an application specific integrated circuit (ASIC) die; a compute express link (CXL) base die, which is including connected through a through silicon via (TSV), to a high bandwidth memory (HBM) including a plurality of core dies; and an interposer connecting the ASIC die to the CXL base die, wherein the CXL base die includes an HMB interface intellectual property (IP) core to convert data transmission and reception between the plurality of core dies and dynamic random access memory (DRAM) in compliance with the data transmission and reception matches a CXL specification, and the HMB interface IP core corresponds to a non-Joint Electron Device Engineering Council (JEDEC) standard.

According to another aspect of the present disclosure, a memory device may include: a high bandwidth memory (HBM) including a base die and a plurality of core dies that are sequentially stacked on the base die, wherein the base die includes an HMB interface intellectual property (IP) core configured to convert data transmission and reception between the plurality of core dies and dynamic random access memory (DRAM) in compliance with peripheral component interconnect express (PCIe), universal chipset interconnect express (UCIe), and die-to-die (D2D) interfaces, and the HMB interface IP core corresponds to a non-Joint Electron Device Engineering Council (JEDEC) standard.

BRIEF DESCRIPTION OF DRAWINGS

Embodiments of the inventive concept will be more clearly understood from the following detailed description taken in conjunction with the accompanying drawings in which:

FIG. 4 illustrates a CXL memory device according to one or more embodiments;

FIG. 5 illustrates a semiconductor device according to one or more embodiments;

FIGS. 6A and 6B illustrate a CXL base die according to one or more embodiments;

FIGS. 9A, 9B, and 9C illustrate semiconductor device layouts according to one or more embodiments;

DETAILED DESCRIPTION OF EMBODIMENTS

Hereinafter, embodiments are described in detail with reference to the accompanying drawings.

Figure 1A:
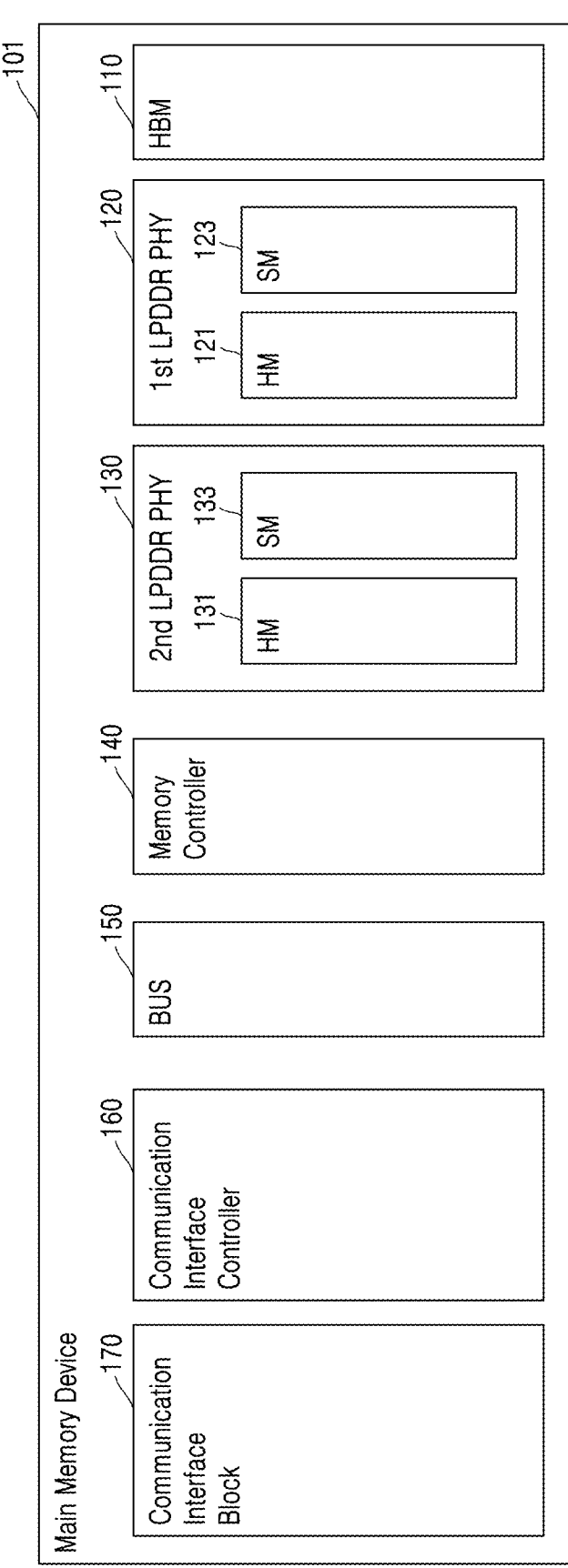
FIG. 1A illustrates a main memory device according to a comparative example.

FIG. 1A illustrates a main memory device 101 according to a comparative example.

Referring to FIG. 1A, the main memory device 101 may include a high bandwidth memory (HBM) 110, a first low power double data rate physical layer interface (LPDDR PHY) 120, a second LPDDR PHY 130, a memory controller 140, a bus 150, a communication interface controller 160, and a communication interface block 170.

The HBM 110 may include a plurality of memory dies that are stacked, wherein data is written to or read from the plurality of memory dies in a parallel manner through a plurality of channels. In some embodiments, an HBM may include a plurality of dynamic random access memory (DRAM) dies and may be referred to as HBM DRAM.

The first LPDDR PHY 120 may include a plurality of input/output (I/O) circuits to access the HBM 110. For example, the first LPDDR PHY 120 may include one or more ports for communication with the HBM 110. The first LPDDR PHY 120 may include a physical or electrical layer and a logical layer provided for signals, frequencies, timings, driving, detailed operation parameters, and functionality to facilitate communication between the HBM 110 and the controller 140. For example, the first LPDDR PHY 120 may include a hard macro (HM) block 121 configured to receive a signal from the HBM 110 and electrically convert the signal and a soft macro (SM) block 123 configured to convert an output of the HM block 121 to a format suitable for the second LPDDR PHY 130. The first LPDDR PHY 120 may perform memory interfacing operations, such as selection of a row and a column corresponding to a memory cell, writing data to the memory cell, and reading the written data. The first LPDDR PHY 120 may support a Joint Electron Device Engineering Council (JEDEC) standard.

The second LPDDR PHY 130 may include a plurality of I/O circuits to interface with the communication interface block 170. For example, the second LPDDR PHY 130 may include a physical or electrical layer and a logical layer provided for signals, frequencies, timings, driving, detailed operation parameters, and functionality required for communication based on the communication interface block 170. For example, the second LPDDR PHY 130 may include an HM block 131 configured to receive a signal from the first LPDDR PHY 120 and electrically convert the signal and an SM block 133 configured to convert an output of the HM block 131 such that the converted output is transferred to the controller 140. The second LPDDR PHY 130 may support the JEDEC standard.

The memory controller 140 may control a general operation of the main memory device 101. For example, the memory controller 140 may receive an output of the second LPDDR PHY 130 and provide read data to the communication interface block 170 via the bus 150, or receive an output of the communication interface block 170 via the bus 150 and provide write data to the HBM 110 via the second LPDDR PHY 130 and the first LPDDR PHY 120.

The communication interface block 170 may provide communication interfaces, such as a die-to-die (D2D) interface, a peripheral component interconnect express (PCIe) interface, and a universal chiplet interconnect express (UCIe) interface. The communication interface controller 160 may control the communication interfaces, such as D2D, PCIe, and UCIe interfaces, for managing the communication between different components within a system.

The main memory device 101 as described above in the comparative example may perform a communication protocol and/or interface conversion according to the JEDEC standard twice. For example, the main memory device 101 may perform a communication protocol and/or interface conversion once in the first LPDDR PHY 120 to access the HBM 110 and again in the second LPDDR PHY 130 to align with a plurality of communication protocols. However, because the communication protocol and/or interface conversion is supposed to be performed twice, the memory latency of the HBM 110 may increase.

Figure 1B:
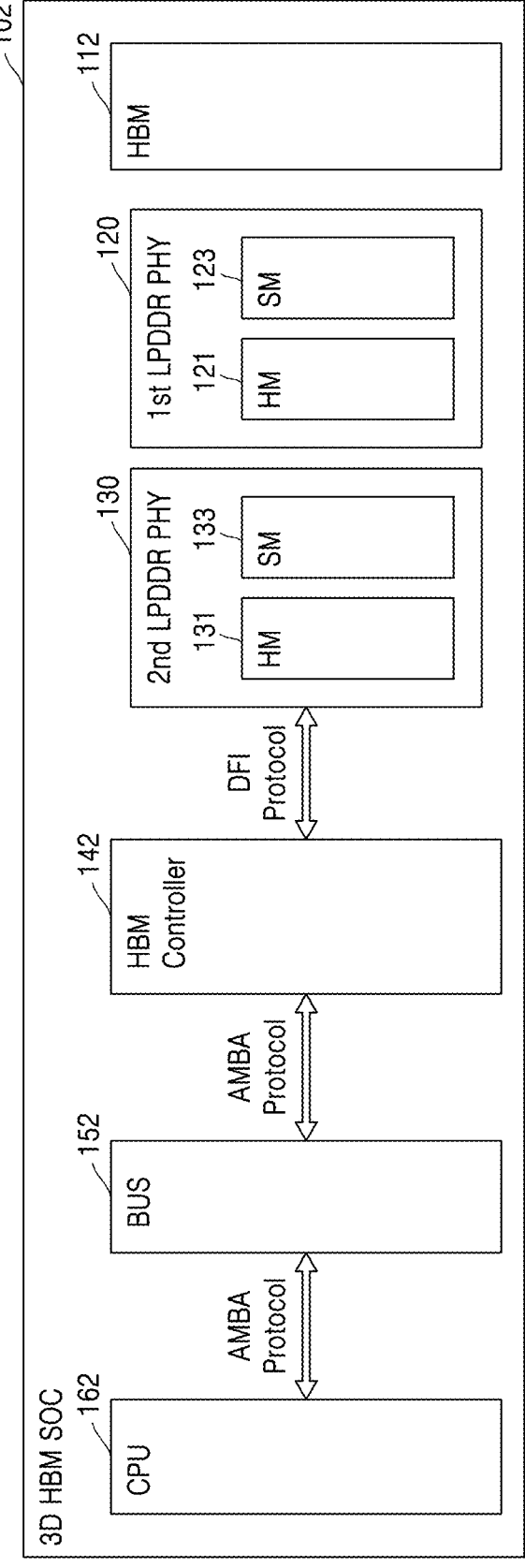
FIG. 1B illustrates a system on chip (SoC) according to a comparative example.

FIG. 1B illustrates a main memory device according to a comparative example.

Referring to FIG. 1B, a system on chip (SoC) 102 may include an HBM 112 including a plurality of core dies, the first LPDDR PHY 120, the second LPDDR PHY 130, an HBM controller 142, a bus 152, and a central processing unit (CPU) 162.

The HBM 112 may include a plurality of memory dies that are stacked, wherein data is written to or read from the plurality of memory dies in a parallel manner through a plurality of channels. In some embodiments, an HBM may include a plurality of DRAM dies and may be referred to as HBM DRAM.

The first LPDDR PHY 120 may include a plurality of I/O circuits to access the HBM 112. For example, the first LPDDR PHY 120 may include one or more ports for communication with the HBM 112. The first LPDDR PHY 120 may include a physical or electrical layer and a logical layer provided for signals, frequencies, timings, driving, detailed operation parameters, and functionality to facilitate communication between the HBM 112 and the HBM controller 142. For example, the first LPDDR PHY 120 may include the HM block 121 configured to receive a signal from the HBM 112 and electrically convert the signal and the SM block 123 configured to convert an output of the HM block 121 to a format suitable for the second LPDDR PHY 130. The first LPDDR PHY 120 may perform memory interfacing operations, such as selection of a row and a column corresponding to a memory cell, writing data to the memory cell, and reading the written data. The first LPDDR PHY 120 may support the JEDEC standard.

The second LPDDR PHY 130 may include a plurality of I/O circuits to interface with the HBM controller 142. For example, the second LPDDR PHY 130 may include a physical or electrical layer and a logical layer provided for signals, frequencies, timings, driving, detailed operation parameters, and functionality required for communication based on the HBM controller 142. For example, the second LPDDR PHY 130 may include the HM block 131 configured to receive a signal from the first LPDDR PHY 120 and electrically convert the signal and the SM block 133 configured to convert an output of the HM block 131 such that the converted output is transferred to the HBM controller 142. The second LPDDR PHY 130 may support the JEDEC standard.

The HBM controller 142 may perform protocol conversion for communication of a main memory. For example, the HBM controller 142 may be based on a double data rate (DDR) PHY interface (DFI) protocol. The HBM controller 142 may convert the DFI protocol into an advanced microcontroller bus architecture (AMBA) protocol, which the bus 152 and the CPU 162 support. The CPU 162 may perform various computations by using data received from the HBM controller 142 via the bus 152.

The SoC 102 described above according to a comparative example may perform a communication protocol and/or interface conversion according to the JEDEC standard twice. For example, the SoC 102 may perform a communication protocol and/or interface conversion in the first LPDDR PHY 120 once to access the HBM 112 and again in the second LPDDR PHY 130 to align with a plurality of communication protocols. However, because the a communication protocol and/or interface conversion is supposed to be performed twice, the memory latency of the HBM 112 may increase.

Figure 2:
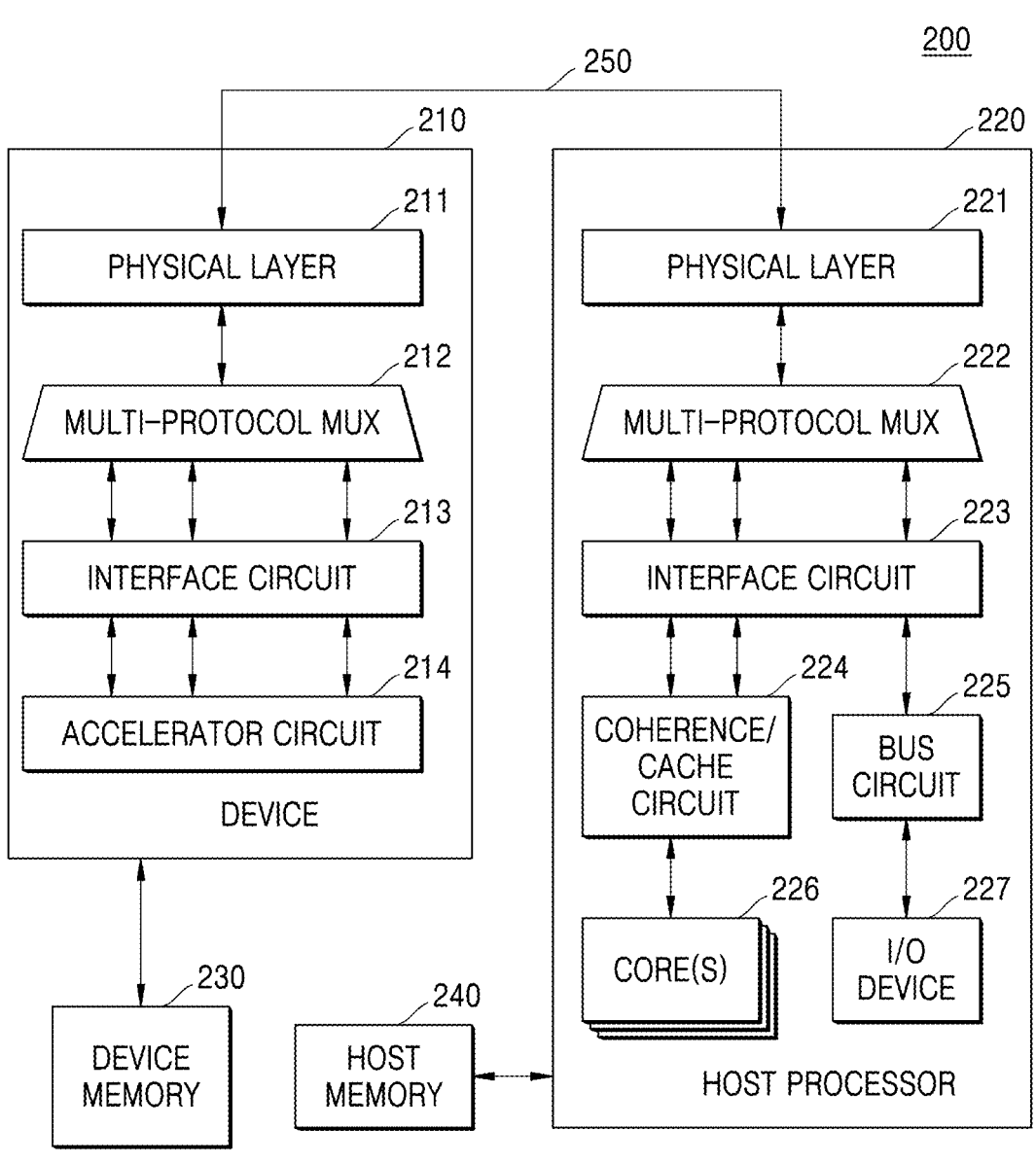
FIG. 2 is a block diagram illustrating a system according to one or more embodiments.

FIG. 2 is a block diagram illustrating a system 200 according to one or more embodiments.

Referring to FIG. 2, the system 200 may be a computing system (or a component included in a computing system) including a device 210 and a host processor 220 communicating with each other. For example, the system 200 may be included in a stationary computing system, such as a desktop computer, a server, or a kiosk, or included in a portable computing system, such as a laptop computer, a mobile phone, or a wearable device. In addition, in some embodiments, the system 200 may be included in an SoC or a system in package (SiP), in which the device 210 and the host processor 220 are implemented in one chip or package.

As shown in FIG. 2, the system 200 may include the device 210, the host processor 220, a device memory 230, and a host memory 240. According to various embodiments, the system 200 may not include the device memory 230. Referring to FIG. 2, the device 210 and the host processor 220 may communicate with each other via a link 250 and mutually transmit or receive a message/data over the link 250.

Although embodiments are described with reference to the link 250 based on a compute express link (CXL) specification supporting CXL protocols, the embodiments are not limited thereto and the device 210 and the host processor 220 may communicate with each other based on coherent interconnect techniques, such as an XBus protocol, an NVLink protocol, an infinity fabric protocol, a cache coherent interconnect for accelerators (CCIX) protocol, and a coherent accelerator processor interface (CAPI).

In some embodiments, the link 250 may support multiple protocols and transfer a message and/or data based on the multiple protocols. For example, the link 250 may support CXL protocols including a non-coherent protocol (e.g., CXL.io), a coherent protocol (e.g., CXL.cache), and a memory access protocol (or a memory protocol) (e.g., CXL.mem). In some embodiments, the link 250 may support protocols, such as a peripheral component interconnect (PCI) protocol, a PCIe protocol, a universal serial bus (USB) protocol, and a serial advanced technology attachment (SATA) protocol. In the specification, a protocol supported by the link 250 may be referred to as an interconnect protocol.

The device 210 may be an adaptable component configured to fulfill a specific purpose for the host processor 220. In some embodiments, according to CXL specification 2.0, the device 210 may be configured to operate as an accelerator, offering support for the functionalities outlined in the CXL specification. For example, software executed on the host processor 220 may offload at least a portion of a computing task and/or an I/O task to the device 210. In some embodiments, the device 210 may include at least one of programmable components, such as a graphics processing unit (GPU) and a neural processing unit (NPU), components, such as an intellectual property (IP) core, configured to provide a fixed function, and reconfigurable components, such as a field programmable gate array (FPGA). As shown in FIG. 2, the device 210 may include a physical layer 211, a multi-protocol multiplexer 212, an interface circuit 213, and an accelerator circuit 214 and communicate with the device memory 230.

The accelerator circuit 214 may perform a useful function, which the device 210 provides to the host processor 220, and may be referred to as an accelerator logic. As shown in FIG. 2, when the device memory 230 is included in the system 200, the accelerator circuit 214 may communicate with the device memory 230 based on a protocol independent to the link 250, i.e., a device-specific protocol. In addition, as shown in FIG. 2, the accelerator circuit 214 may communicate with the host processor 220 via the interface circuit 213 by using a plurality of protocols.

The interface circuit 213 may determine one of the plurality of protocols based on a message and/or data for communication between the accelerator circuit 214 and the host processor 220. The interface circuit 213 may be connected to at least one protocol queue included in the multi-protocol multiplexer 212 and exchange a message and/or data with the host processor 220 via the at least one protocol queue. In some embodiments, the interface circuit 213 and the multi-protocol multiplexer 212 may be integrated to one component. In some embodiments, the multi-protocol multiplexer 212 may include a plurality of protocol queues respectively corresponding to the plurality of protocols supported by the link 250. In addition, in some embodiments, the multi-protocol multiplexer 212 may arbitrate between communications based on different protocols and provide selected communications to the physical layer 211. In some embodiments, the physical layer 211 may be connected to a physical layer 221 of the host processor 220 via a single interconnect, a bus, a trace, or the like.

The host processor 220 may be a main processor, e.g., a CPU, of the system 200, and in some embodiments, the host processor 220 may operate according to the CXL specification. As shown in FIG. 2, the host processor 220 may be connected to the host memory 240 and may include the physical layer 221, a multi-protocol multiplexer 222, an interface circuit 223, a coherence/cache circuit 224, a bus circuit 225, at least one core 226, and an I/O device 227.

The at least one core 226 may execute an instruction and may be connected to the coherence/cache circuit 224. The coherence/cache circuit 224 may include a cache hierarchy and may be referred to as a coherence/cache logic. As shown in FIG. 2, the coherence/cache circuit 224 may communicate with the at least one core 226 and the interface circuit 223. For example, the coherence/cache circuit 224 may enable communication based on two or more protocols including a coherence protocol and a memory access protocol. In some embodiments, the coherence/cache circuit 224 may include a direct memory access (DMA) circuit. The I/O device 227 may be used to communicate with the bus circuit 225. For example, the bus circuit 225 may be a PCIe logic and the I/O device 227 may be a PCIe I/O device.

The interface circuit 223 may enable communication between components, e.g., the coherence/cache circuit 224 and the bus circuit 225, of the host processor 220 and the device 210. In some embodiments, the interface circuit 223 may enable communication of a message and/or data between components of the host processor 220 and the device 210 based on the plurality of protocols, e.g., a non-coherence protocol, a coherence protocol, and a memory protocol. For example, the interface circuit 223 may determine one of the plurality of protocols based on a message and/or data for communication between components of the host processor 220 and the device 210.

The multi-protocol multiplexer 222 may include at least one protocol queue. The interface circuit 223 may be connected to the at least one protocol queue and may exchange a message and/or data with the device 210 via the at least one protocol queue. In some embodiments, the interface circuit 223 and the multi-protocol multiplexer 222 may be integrated to one component. In some embodiments, the multi-protocol multiplexer 222 may include a plurality of protocol queues respectively corresponding to the plurality of protocols supported by the link 250. In addition, in some embodiments, the multi-protocol multiplexer 222 may arbitrate between communications based on different protocols and provide selected communications to the physical layer 221.

In some embodiments, the host processor 220 may execute hierarchical software including an operating system (OS) and/or applications executed on the OS and access the host memory 240 and/or the device memory 230 based on a virtual memory. The host processor 220 may be connected to the host memory 240 via a D2D interface, and the device 210 may also be connected to the device memory 230 via the D2D interface.

As described below with reference to the drawings, the D2D interface may support a CXL protocol or a UCIe protocol for communication between a first die and a second die. The first die may include a first interconnect interface that provides, as the D2D interface, first lanes configured to communicate with the second die. The second die may include a plurality of connection chiplet dies configured to communicate with the first die, wherein each of the plurality of connection chiplet dies may include a second interconnect interface that provides second lanes as the D2D interface. Each of the first and second interconnect interfaces may include a logic circuit indicating a correlation between the number of connection chiplet dies connected to the first lanes and connection signal pins among a plurality of signal pins of each of the connection chiplet dies. According to one or more embodiments, based on a mapping table of the logic circuit, a large number of chiplet memories implemented by a relatively small number of connection signal pins (e.g., command/address (CA) pins and data (DQ) pins) may provide a high-capacity memory solution for the D2D interface. According to another embodiment, based on the mapping table of the logic circuit, a small number of chiplet memories implemented by a relatively large number of connection CA pins and connection DQ pins may provide a high-speed and high-performance solution for the D2D interface.

Figure 3:
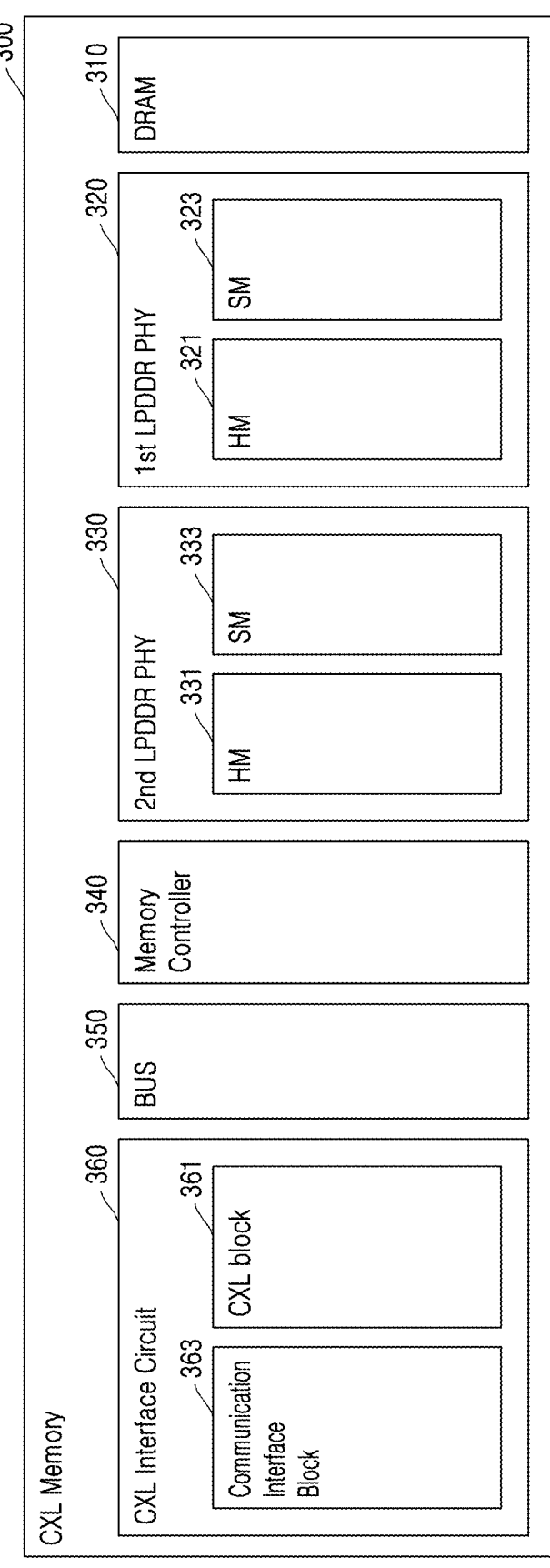
FIG. 3 illustrates a compute express link (CXL) memory device according to a comparative example.

FIG. 3 illustrates a CXL memory device 300 according to a comparative example.

Referring to FIG. 3, the CXL memory device 300 may include DRAM 310, a first LPDDR PHY 320, a second LPDDR PHY 330, a memory controller 340, a bus 350, and a CXL interface circuit 360.

The first LPDDR PHY 320 may include a plurality of I/O circuits to access the DRAM 310, and for example, the first LPDDR PHY 320 may include one or more ports for communication with the DRAM 310. The first LPDDR PHY 320 may include a physical or electrical layer and a logical layer provided for signals, frequencies, timings, driving, detailed operation parameters, and functionality to facilitate communication between the DRAM 310 and the CXL interface circuit 360. For example, the first LPDDR PHY 320 may include an HM block 321 configured to receive a signal from the DRAM 310 and electrically convert the signal and an SM block 323 configured to convert an output of the HM block 321 to a format suitable for the second LPDDR PHY 330. The first LPDDR PHY 320 may perform memory interfacing operations, such as selection of a row and a column corresponding to a memory cell, writing data to the memory cell, and reading the written data. The first LPDDR PHY 320 may support the JEDEC standard.

The second LPDDR PHY 330 may include a plurality of I/O circuits to interface or align with the CXL interface circuit 360, and for example, the second LPDDR PHY 330 may include one or more ports for communication based on the CXL protocol. The second LPDDR PHY 330 may include a physical or electrical layer and a logical layer provided for signals, frequencies, timings, driving, detailed operation parameters, and functionality required for communication based on the CXL interface circuit 360. For example, the second LPDDR PHY 330 may include an HM block 331 configured to receive a signal from the first LPDDR PHY 320 and electrically convert the signal and an SM block 333 configured to convert an output of the HM block 331 such that the converted output is transferred to the memory controller 340. The second LPDDR PHY 330 may support the JEDEC standard.

The memory controller 340 may control a general operation of the CXL memory device 300. For example, the memory controller 340 may receive an output of the second LPDDR PHY 330 and provide read data to the CXL interface circuit 360 via the bus 350, or receive an output of the CXL interface circuit 360 via the bus 350 and provide write data to the DRAM 310 via the second LPDDR PHY 330 and the first LPDDR PHY 320.

The CXL interface circuit 360 may include a CXL block 361 and a communication interface block 363. The communication interface block 363 may support communication interfaces, e.g., PCIe and UCIe interfaces.

The CXL memory device 300 described above according to a comparative example may perform conversion according to the JEDEC standard twice. For example, the CXL memory device 300 may perform a communication protocol and/or interface conversion once in the first LPDDR PHY 320 to access the DRAM 310 and again in the second LPDDR PHY 330 to align with the CXL protocol. However, because the communication protocol and/or interface conversion is supposed to be performed twice, the CXL memory latency of the DRAM 310 may increase.

FIG. 4 illustrates a CXL memory device 400 according to one or more embodiments.

Referring to FIG. 4, the CXL memory device 400 may include an HBM 410, an HBM interface IP core 420, a memory controller 430, a bus 440, and a CXL interface circuit 450.

The HBM interface IP core 420 may include a plurality of I/O circuits to access the HBM 410. For example, the HBM interface IP core 420 may include one or more ports for communication with the HBM 410. The HBM interface IP core 420 may include a physical or electrical layer and a logical layer provided for signals, frequencies, timings, driving, detailed operation parameters, and functionality to facilitate communication between the HBM 410 and the CXL interface circuit 450. For example, the HBM interface IP core 420 may directly convert an interface of an HBM core device into the DFI protocol, bypassing the need for conversion to a JEDEC interface. The HBM interface IP core 420 may include a through silicon via (TSV) input and output (IO) block 421 configured to receive a signal from the HBM 410 or provide a signal to the HBM 410 and an SM block 423 configured to convert an output of the TSV IO block 421 into a format suitable for the CXL interface circuit 450. The HBM interface IP core 420 may perform memory interfacing operations, such as selection of a row and a column corresponding to a memory cell of the HBM 410, writing data to the memory cell, and reading the written data. Herein, the HBM interface IP core 420 may not support or adhere to the JEDEC standard. Instead, the HBM interface IP core 420 may correspond to a non-JEDEC PHY.

The memory controller 430 may control a general operation of the CXL memory device 400. For example, the memory controller 430 may receive an output of the HBM interface IP core 420 and provide read data to the CXL interface circuit 450 via the bus 440, or receive an output of the CXL interface circuit 450 via the bus 440 and provide write data to the HBM 410 via the HBM interface IP core 420.

The CXL interface circuit 450 may include a CXL block 451 and a communication interface block 453. The communication interface block 453 may support communication interfaces, e.g., PCIe and UCIe interfaces.

The CXL memory device 400 described above according to one or more embodiments may perform a communication protocol and/or interface conversion only once, thereby reducing a latency consumed in the communication protocol/interface conversion. For example, the CXL memory device 400 may perform the communication protocol/interface conversion only once in the HBM interface IP core 420 to access the HBM 410, thereby aligning an input/an output of the HBM 410 with the CXL protocol and accordingly reducing the latency of a CXL memory device 400.

FIG. 5 illustrates a semiconductor device 500 according to one or more embodiments.

Referring to FIG. 5, the semiconductor device 500 may be implemented as an SiP, a multi-chip package, an SoC or implemented as a package on package including a plurality of packages.

The semiconductor device 500 may include a stacked semiconductor memory 510, an application specific integrated circuit (ASIC) die 520, and an interposer 530. The stacked semiconductor memory 510 and the ASIC die 520 may be connected to the top of the interposer 530.

The stacked semiconductor memory 510 may correspond to an HBM with a bandwidth increased by stacking a plurality of memory chips, e.g., a plurality of dies, and electrically connecting the plurality of memory chips to each other via a TSV. For example, the stacked semiconductor memory 510 may correspond to the HBM 410 of FIG. 4.

The plurality of dies may include a CXL base die 511 and a plurality of core dies 513. Each of the plurality of core dies 513 may correspond to a DRAM slice die. For example, the plurality of core dies 513 may include 12 HBM DRAM slice dies HBM DRAM DIE 0 to HBM DRAM DIE 11.

The CXL base die 511 may include a portion of the CXL memory device 400 of FIG. 4. For example, an HBM interface IP core 541 of the CXL base die 511 may correspond to the HBM interface IP core 420 that interfaces between the HBM 410 and the memory controller 430 in FIG. 4. The CXL base die 511 may include an HBM controller 543, which may correspond to the memory controller 430 of FIG. 4. The CXL base die 511 may include a CXL block 545, which may correspond to the CXL interface circuit 450 of FIG. 4.

The ASIC die 520 may include a compute sub system 521 and a CXL block 523. The CXL block 523 of the ASIC die 520 may perform the same function as the CXL block 545 of the CXL base die 511. The compute sub system 521 may perform various computations. For example, the compute sub system 521 may include at least one among at least one CPU, at least one GPU, and at least one NPU. Particular implementation of the compute sub system 521 is described below with reference to FIGS. 9A to 9C.

Figure 6B:
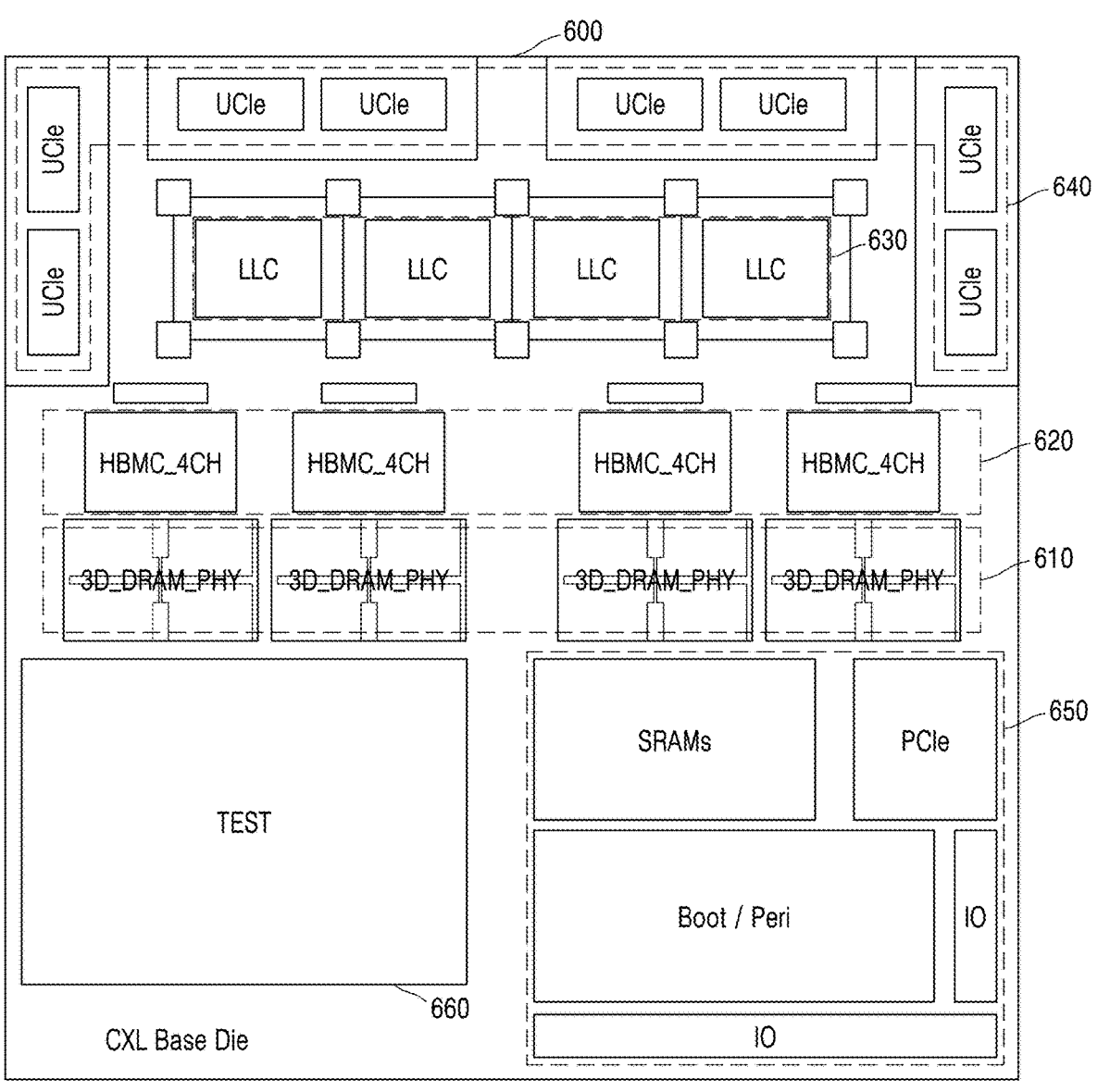

FIGS. 6A and 6B illustrate a CXL base die 600 according to one or more embodiments.

Referring to FIGS. 6A and 6B, the CXL base die 600 may correspond to the CXL base die 511 of FIG. 5.

According to one or more embodiments, the CXL base die 600 may include a PHY interface 610, an HBM controller 620, a low latency channel (LLC) 630, a UCI port 640, a boot module 650, and a test module 660.

The PHY interface 610 may correspond to the HBM interface IP core 541 of FIG. 5. For example, the PHY interface 610 may include four HBM (three-dimensional (3D) DRAM) PHY blocks. Every HBM PHY block may be allocated to three core dies.

The HBM controller 620 may correspond to the HBM controller 543 of FIG. 5. For example, the HBM controller 620 may include four control blocks. The four control blocks may correspond to the four HBM PHY blocks included in the PHY interface 610, respectively, and each control block may process four channels.

The LLC 630 may correspond to the bus 440 of FIG. 4. For example, the LLC 630 may include four LLC blocks. The LLC 630 may be connected to the HBM controller 620. For example, the four LLC blocks may be respectively connected to the four control blocks included in the HBM controller 620.

The UCI port 640 may correspond to the communication interface block 453 of FIG. 4. Referring to FIG. 6B, the UCI port 640 may include ports supporting a UCIe communication interface. For example, the UCI port 640 may include eight UCIe ports. Every two UCIe ports may correspond to one control block of the HBM controller 620. That is, one UCIe port may transmit and receive two channels.

Figure 7A:
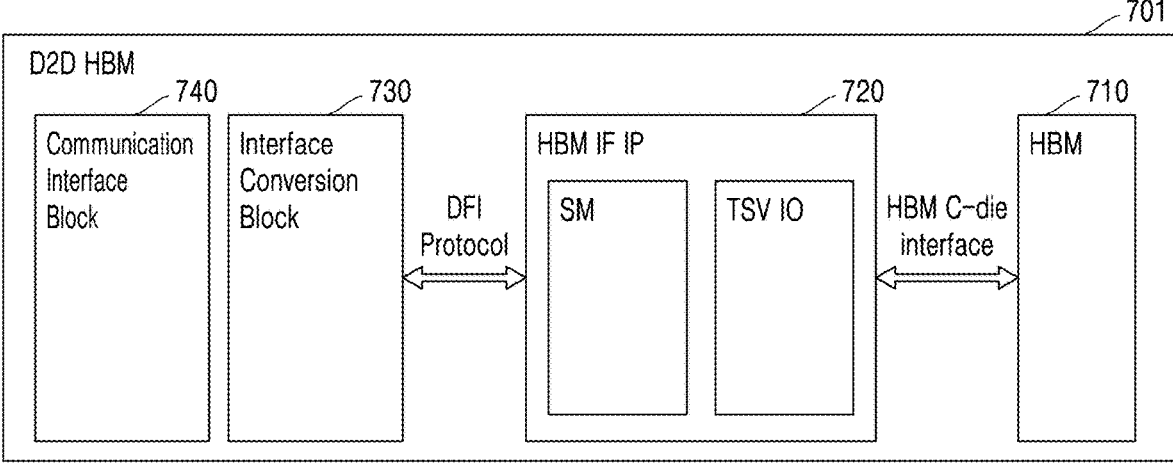
FIG. 7A illustrates a main memory device according to one or more embodiments.

FIG. 7A illustrates a main memory device 701 according to one or more embodiments.

Referring to FIG. 7A, the main memory device 701 may include an HBM 710 including a plurality of core dies, an HBM interface IP core 720, an interface conversion block 730, and a communication interface block 740. The HBM interface IP core 720 may directly convert an interface of an HBM core device into the DFI protocol and bypass (or skip) conversion to a JEDEC interface.

The interface conversion block 730 may perform a communication protocol conversion and/or a communication interface conversion for communication of a main memory. For example, the HBM interface IP core 720 may be based on the DFI protocol. The interface conversion block 730 may convert the DFI protocol into an interface (e.g., a PCIe interface, a UCIe interface, or the like) supporting the main memory.

The communication interface block 740 may support communication interfaces, e.g., the PCIe interface and the UCIe interface, but is not limited thereto. According to various embodiments, the communication interface block 740 may support interfaces, e.g., an industry standard architecture (ISA) interface, a SATA interface, a small computer system interface (SCSI), a serial attached SCSI (SAS), a universal storage bus (USB) attached SCSI (UAS), an internet SCSI (iSCSI), a fiber channel (FC) interface, and an FC over Ethernet (FCOE) interface.

Figure 7B:
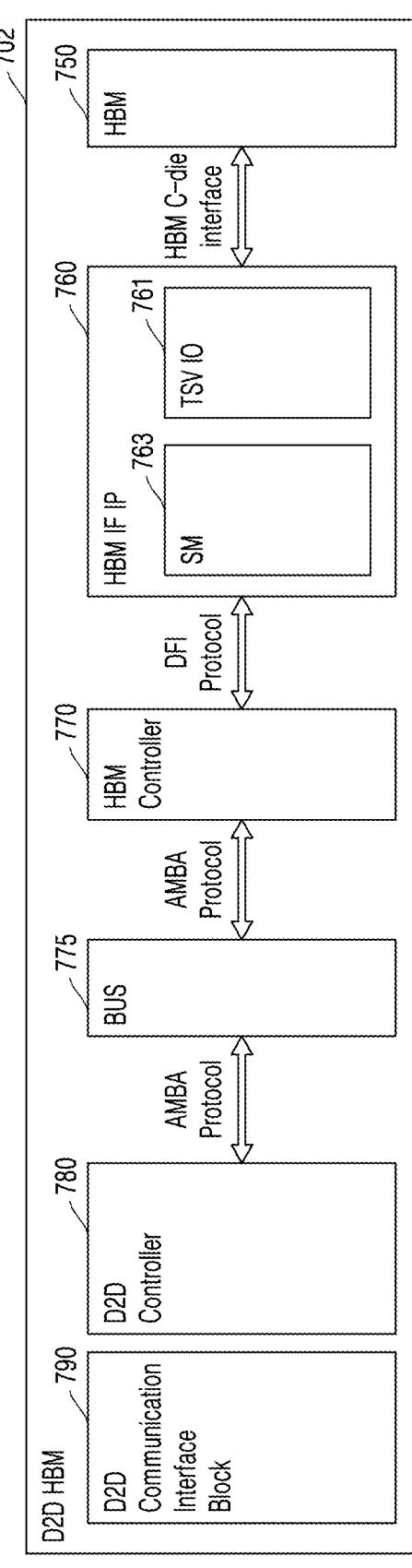
FIG. 7B illustrates a main memory device according to one or more embodiments.

FIG. 7B illustrates a main memory device 702 according to one or more embodiments.

Referring to FIG. 7B, the main memory device 702 may include an HBM 750 including a plurality of core dies, an HBM interface IP core 760, an HBM controller 770, a bus 775, a D2D controller 780, and a D2D communication interface block 790.

The HBM interface IP core 760 may directly convert an interface of a core device included in the HBM 750 into the DFI protocol and bypass (or skip) conversion to a JEDEC interface. The HBM interface IP core 760 may include a TSV IO block 761 configured to receive a signal from the HBM 750 or provide a signal to the HBM 750 and an SM block 763 configured to convert an output of the TSV IO block 761 to a format suitable for the D2D communication interface block 790.

The HBM controller 770 may perform protocol conversion for communication of a main memory. For example, the HBM interface IP core 760 may be based on the DFI protocol. The HBM controller 770 may convert the DFI protocol into the AMBA protocol, which the bus 775 and the D2D controller 780 support.

The D2D communication interface block 790 may support a D2D communication interface. The D2D communication interface may include at least one of a PCIe interface, a UCIe interface, an ISA interface, a SATA interface, a SCSI, an SAS, a UAS, an iSCSI, an FC interface, and an FCOE interface.

Figure 8:
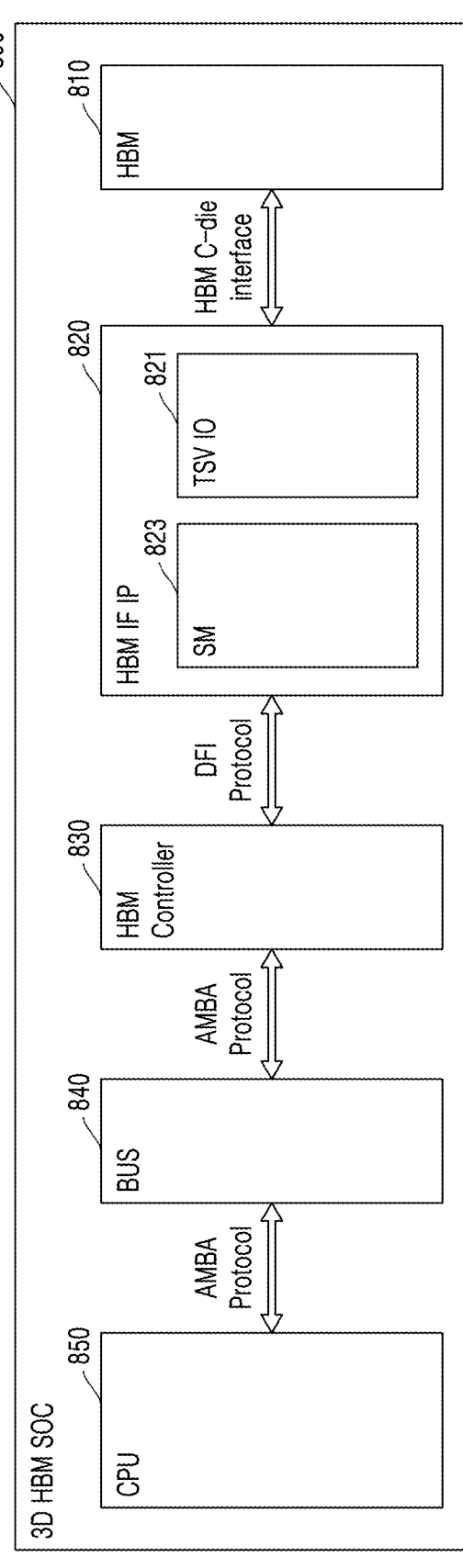
FIG. 8 illustrates an SoC according to one or more embodiments.

FIG. 8 illustrates an SoC 800 according to one or more embodiments.

Referring to FIG. 8, the SoC 800 may include an HBM 810 including a plurality of core dies, an HBM interface IP core 820, an HBM controller 830, a bus 840, and a CPU 850.

The HBM interface IP core 820 may directly convert an interface of a core device included in the HBM 810 into the DFI protocol and bypass (or skip) conversion to a JEDEC interface. The HBM interface IP core 820 may include a TSV IO block 821 configured to receive a signal from the HBM 810 or provide a signal to the HBM 810 and an SM block 823 configured to convert an output of the TSV IO block 821 to a format suitable for the HBM controller 830.

The HBM controller 830 may perform protocol conversion for communication of a main memory. For example, the HBM interface IP core 820 may be based on the DFI protocol. The HBM controller 830 may convert the DFI protocol into the AMBA protocol, which the bus 840 and the CPU 850 support. The CPU 850 may perform various computations by using data received from the HBM controller 830 via the bus 840.

Figure 9A:
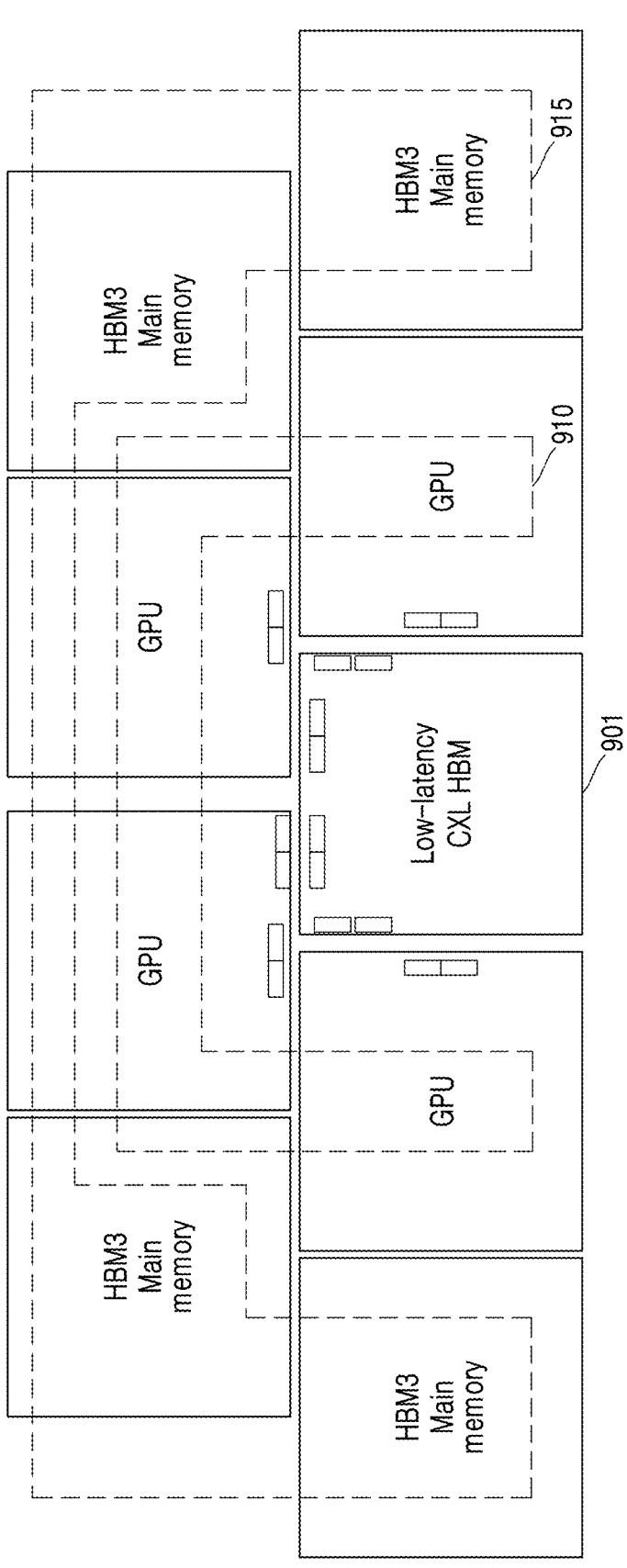
Figure 9B:
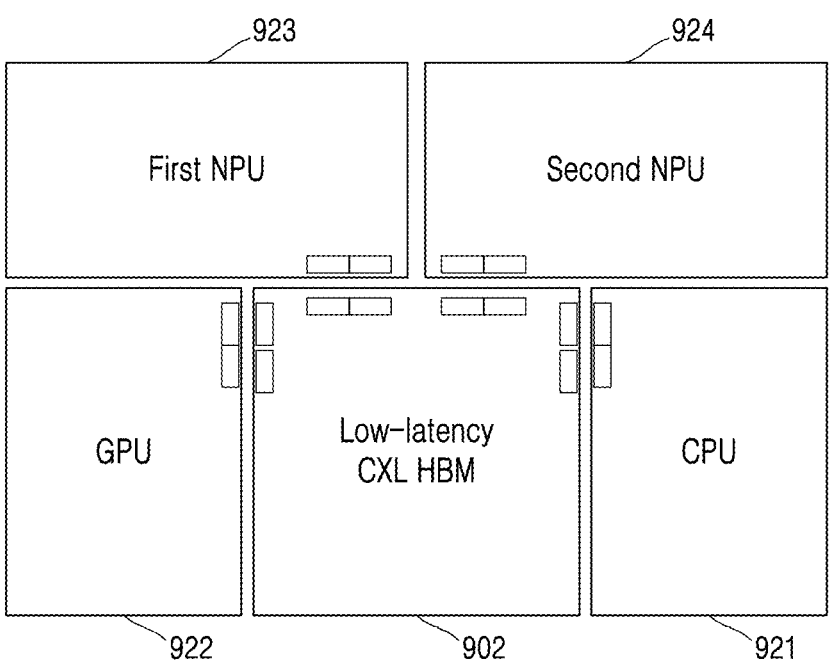
Figure 9C:
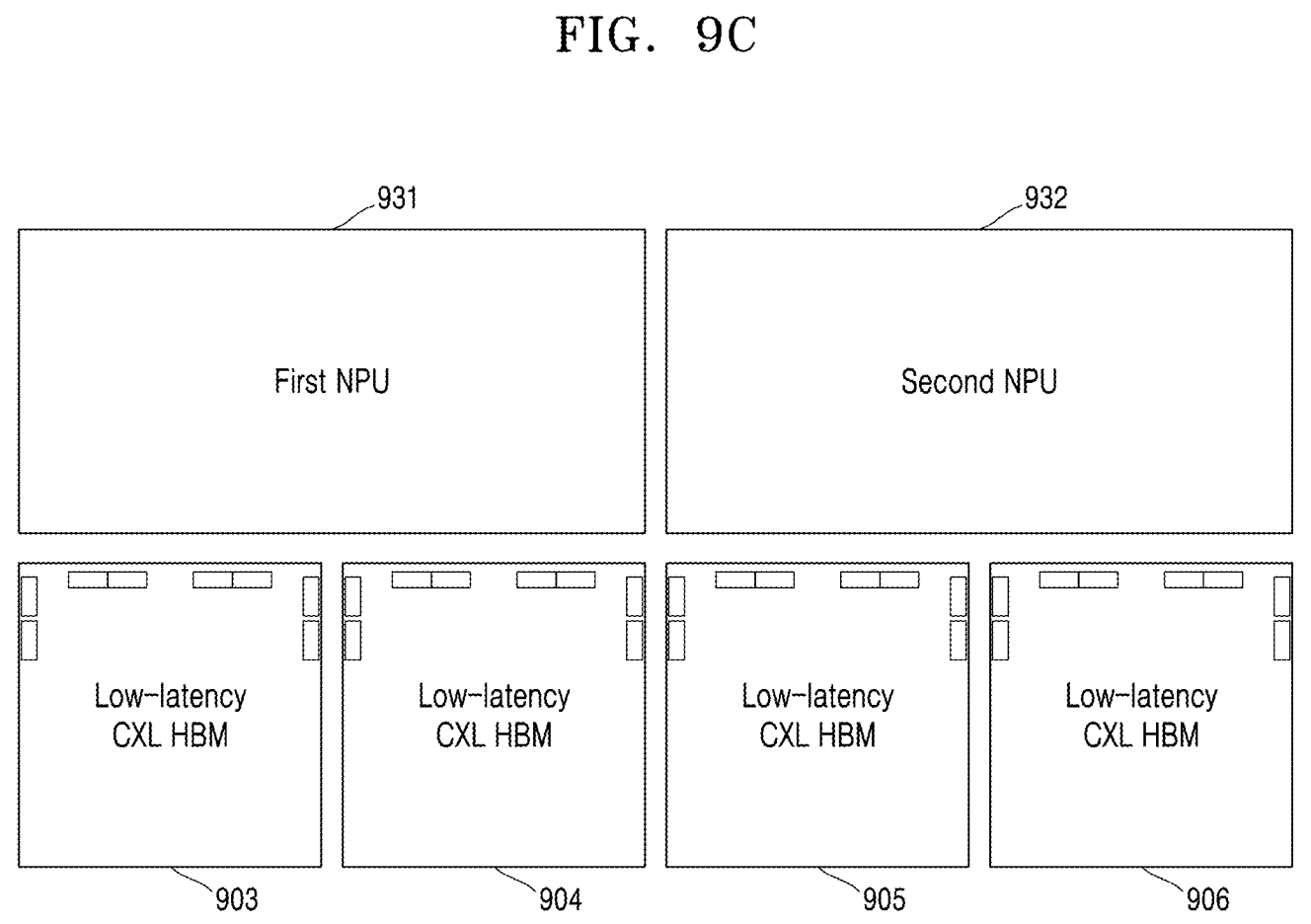

FIGS. 9A to 9C illustrate semiconductor device layouts according to one or more embodiments.

Referring to FIG. 9A, a CXL HBM 901 according to various embodiments may be connected in parallel to four GPUs 910. For example, referring to FIGS. 5 and 9A, the compute sub system 521 of the ASIC die 520 may include the four GPUs 910. The CXL HBM 901 may be connected to the four GPUs 910 via UCIe ports. For example, the CXL HBM 901 may be connected to one GPU 910 by using two UCIe ports. This configuration enables the transmission and reception through two channels for each UCIe port, allowing the CXL HBM 901 to perform data transmission and reception through four channels for each GPU 910.

According to one or more embodiments, the four GPUs 910 may be connected to dedicated HBMs 915, respectively. In this case, each of the dedicated HBMs 915 may support the JEDEC standard. One dedicated HBM 915 connected to one GPU 910 may transmit and receive data to and from only the one GPU 910 connected to the one dedicated HBM 915. However, the CXL HBM 901 may serve as a shared resource for the four GPUs 910. For example, one GPU 910 may require a high channel bandwidth for graphics processing, while the other three GPUs 910 may need lower channel bandwidths. In response, the resource allocation of the CXL HBM 901 may be dynamically adjusted according to the channel bandwidth requirements of each GPU 910.

Referring to FIG. 9B, a CXL HBM 902 according to various embodiments may be connected in parallel to a CPU 921, a GPU 922, a first NPU 923, and a second NPU 924. For example, referring to FIGS. 5 and 9B, the compute sub system 521 of the ASIC die 520 may include the CPU 921, the GPU 922, the first NPU 923, and the second NPU 924. The CXL HBM 902 may be connected to the CPU 921, the GPU 922, the first NPU 923, and the second NPU 924 via UCIe ports. For example, the CXL HBM 902 may be connected to each of the CPU 921, the GPU 922, the first NPU 923, and the second NPU 924 by using two UCIe ports.

That is, two channels may be transmitted and received for each UCIe port and the CXL HBM 902 may transmit and receive data through four channels for each of the CPU 921, the GPU 922, the first NPU 923, and the second NPU 924.

According to one or more embodiments, the CXL HBM 902 may serve as a shared resource for the CPU 921, the GPU 922, the first NPU 923, and the second NPU 924. For example, when the CPU 921 requires significant resources to perform a task, a channel bandwidth allocated to the CPU 921 may be increased, while a channel bandwidth allocated to the other three processing units (e.g., the GPU 922, the first NPU 923, and the second NPU 924) may be reduced. This dynamic adjustment may optimize resource utilization in the CXL HBM 902.

Referring to FIG. 9C, four CXL HBMs, e.g., first to fourth CXL HBMs 903 to 906, according to various embodiments may be connected to a first NPU 931 and a second NPU 932. For example, the first NPU 931 may be connected to the first CXL HBM 903 and the second CXL HBM 904 and the second NPU 932 may be connected to the third CXL HBM 905 and the fourth CXL HBM 906. Each of the first NPU 931 and the second NPU 932 may be connected to a CXL HBM via UCIe ports. For example, each of the first CXL HBM 903 and the second CXL HBM 904 may be connected to the first NPU 931 by using two UCIe ports and each of the third CXL HBM 905 and the fourth CXL HBM 906 may be connected to the second NPU 932 by using two UCIe ports.

According to one or more embodiments, the first CXL HBM 903 and the second CXL HBM 904 is sharable by the first NPU 931 and the third CXL HBM 905 and the fourth CXL HBM 906 is sharable by the second NPU 932. For example, the first NPU 931 may perform training or inference of a neural network, whereas the second NPU 932 may not perform training or inference. The first CXL HBM 903 and the second CXL HBM 904 connected to the first NPU 931 may set a channel bandwidth high for the first NPU 931 and the third CXL HBM 905 and the fourth CXL HBM 906 connected to the second NPU 932 may set a channel bandwidth low for the second NPU 932, thereby dynamically using a resource.

Figure 10:
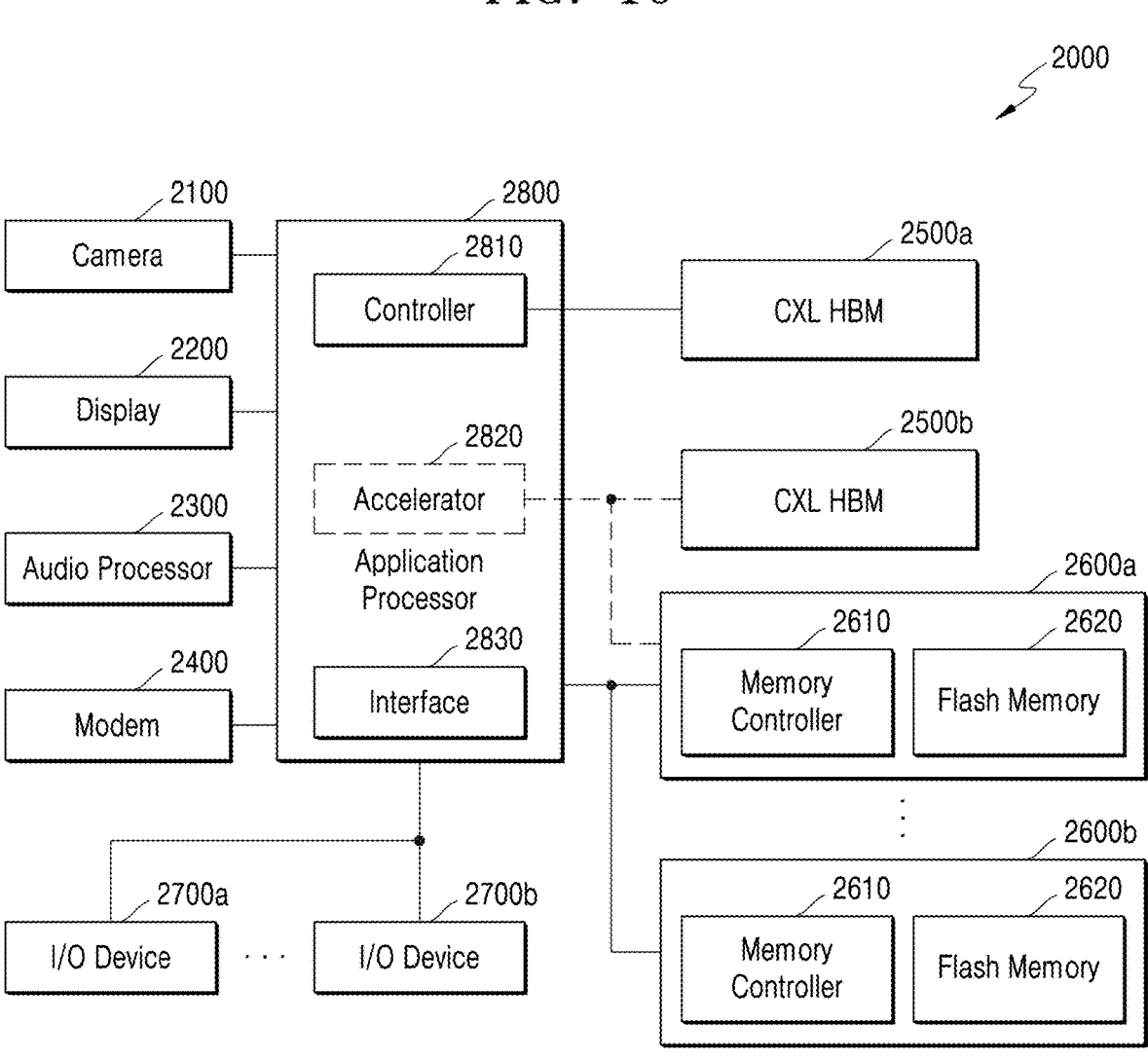
FIG. 10 is a block diagram illustrating an electronic apparatus including a die-to-die (D2D) interface according to embodiments.

FIG. 10 is a block diagram of a system 2000 illustrating an electronic apparatus including a D2D interface according to embodiments.

Referring to FIG. 10, the system 2000 may include a camera 2100, a display 2200, an audio processor 2300, a modem 2400, CXL HBMs 2500a and 2500b, flash memory devices 2600a and 2600b, I/O devices 2700a and 2700b, and an application processor (AP) 2800. Each of the flash memory devices 2600a and 2000b may include a memory controller 2610 and a flash memory 2620 that contains memory cells. The system 2000 may be implemented by a laptop computer, a mobile terminal, a smartphone, a tablet personal computer (PC), a wearable device, a healthcare device, or an Internet of Things (IoT) device. Alternatively, the system 2000 may be implemented by a server or a PC.

The camera 2100 may capture a still image or a moving picture according to control by a user and store the captured image/video data therein or transmit the captured image/video data to the display 2200. The audio processor 2300 may process audio data included in content in the flash memory devices 2600a and 2600b or from a network. The modem 2400 may modulate and transmit a signal for wired/wireless data transmission and reception and demodulate a signal into an original signal at a reception side. The I/O devices 2700a and 2700b may include devices, such as a USB, a storage, a digital camera, a secure digital (SD) card, a digital versatile disc (DVD), a network adapter, and a touch screen, configured to provide a digital input and/or output function.

The AP 2800 may control a general operation of the system 2000. The AP 2800 may include a controller 2810, an accelerator block or accelerator chip 2820, and an interface block 2830. The AP 2800 may control the display 2200 to display, on the display 2200, a portion of content stored in the flash memories 2600a and 2600b. If a user input is received through the I/O devices 2700a and 2700b, the AP 2800 may perform a control operation corresponding to the user input. The AP 2800 may include the accelerator block 2820 that is an exclusive circuit for artificial intelligence (AI) data computation, or the accelerator chip 2820 may be provided separately from the AP 2800. The CXL HBM 2500b may be additionally mounted in the accelerator block or accelerator chip 2820. An accelerator is a function block configured to professionally perform a particular function of the AP 2800 and may include a GPU that is a function block configured to professionally perform graphics data processing, an NPU that is a block configured to professionally perform AI computation and inference, and a data processing unit (DPU) that is a block configured to professionally perform data transmission.

The system 2000 may include the CXL HBMs 2500a and 2500b. The AP 2800 may control the CXL HBMs 2500a and 2500b through a command and a mode register set (MRS) according to the JEDEC standard or communicate with the CXL HBMs 2500a and 2500b by setting a DRAM interface protocol to use company-specific functions, such as low voltage/high speed/reliability, and a cyclic redundancy check (CRC)/error correction code (ECC) function. For example, the AP 2800 may communicate with the CXL HBM 2500a by using an interface, which meets the JEDEC standard, such as LPDDR4 or LPDDR5, and the accelerator block or accelerator chip 2820 may communicate with the CXL HBM 2500b by setting a new DRAM interface protocol to control the CXL HBM 2500b having a higher bandwidth than the CXL HBM 2500a, the CXL HBM 2500b being for an accelerator.

The CXL HBMs 2500a and 2500b may be initialized at a power-on time point of the system 2000 and used as a temporary storage of an OS and application data by loading the OS and the application data thereon or used as an execution space of various kinds of software code.

Figure 11:
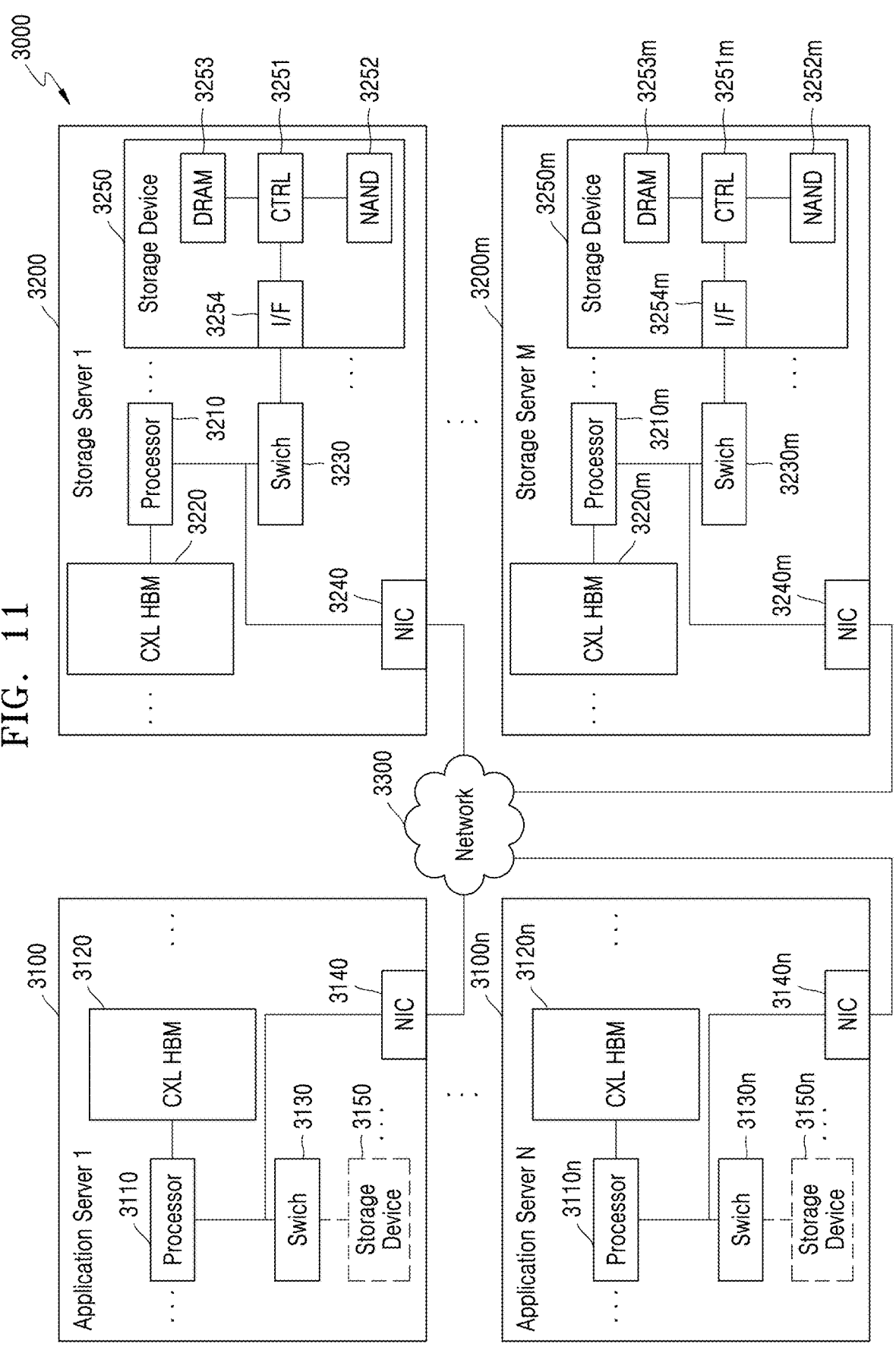
FIG. 11 is a block diagram illustrating a data center including a CXL memory device according to one or more embodiments.

FIG. 11 is a block diagram illustrating a data center 3000 including a CXL memory device according to one or more embodiments.

Referring to FIG. 11, the data center 3000 is a facility configured to store various kinds of data and provide a service and may be referred to as a data storage center. The data center 3000 may be a system for operating a search engine and a database and may be a computing system used for companies, such as banks, or government organizations. The data center 3000 may include application servers 3100 to 3100n and storage servers 3200 to 3200m. The number of application servers 3100 to 3100n and the number of storage servers 3200 to 3200m may be variously selected according to embodiments, and the number of application servers 3100 to 3100n may be different from the number of storage servers 3200 to 3200m.

The application server 3100 or the storage server 3200 may include at least one of a processor 3110 or 3210 and a memory 3120 or 3220, respectively. When the storage server 3200 is described as an example, the processor 3210 may control a general operation of the storage server 3200 and access the memory 3220 to execute an instruction and/or data loaded on the memory 3220. The memory 3220 may be double data rate synchronous DRAM (DDR SDRAM), an HBM, a hybrid memory cube (HMC), a dual in-line memory module (DIMM), an Optane DIMM, a nonvolatile DIMM (NVMDIMM), or a CXL memory device (CXL HBM) including an HBM. According to one or more embodiments, the numbers of processors 3210 and memories 3220 included in the storage server 3200 may be variously selected. In one or more embodiments, the processor 3210 and the memory 3220 may provide a processor-memory pair. In one or more embodiments, the number of processors 3210 may be different from the number of memories 3220. The processor 3210 may include a single-core processor or a multi-core processor. The description of the storage server 3200 may also be similarly applied to the application server 3100. According to one or more embodiments, the application server 3100 may not include a storage device 3150. The storage server 3200 may include at least one storage device 3250. The number of storage devices 3250 included in the storage server 3200 may be variously selected according to embodiments.

In the application server 3100 or the storage server 3200, the memory 3120 or 3220 may be a CXL memory device or a main memory device as described above with reference to FIGS. 1 to 9C. For example, the CXL memory device or the main memory device may include the HBM 410. The memory 3120 or 3220 may be coupled to a memory controller configured to perform control such that a computation task according to a kernel, which is offloaded from the processor 3110 or 3210, is performed. The CXL memory device including the HBM 410 may directly convert a communication protocol or interface of an HBM core die into the DFI protocol according to a non-JEDEC PHY through an HBM interface IP core, thereby providing a reduced latency.

The application servers 3100 to 3100n and the storage servers 3200 to 3200m may communicate with each other via a network 3300. The network 3300 may be implemented using an FC, Ethernet, or the like. Herein, the FC is a medium used for relatively high-speed data transmission and may use an optical switch providing high performance/high availability. According to an access scheme of the network 3300, the storage servers 3200 to 3200m may be provided as a file storage, a block storage, or an object storage.

In one or more embodiments, the network 3300 may be a storage-dedicated network, such as a storage area network (SAN). For example, the SAN may be an FC-SAN using an FC network and implemented according to an FC protocol (FCP). As another example, the SAN may be an Internet protocol (IP)-SAN using a transmission control protocol (TCP)/IP network and implemented according to a SCSI over TCP/IP or iSCSI protocol. In another embodiment, the network 3300 may be a general network, such as a TCP/IP network. For example, the network 3300 may be implemented according to an FCOE protocol, a network attached storage (NAS) protocol, a nonvolatile memory express over fabrics (NVMe-oF) protocol, or the like.

Hereinafter, the application server 3100 and the storage server 3200 are mainly described. A description of the application server 3100 may also be applied to the other application servers 3100n, and a description of the storage server 3200 may also be applied to the other storage servers 3200m.

The application server 3100 may store, in one of the storage servers 3200 to 3200m via the network 3300, data requested by a user or a client to store. In addition, the application server 3100 may acquire, from one of the storage servers 3200 to 3200*m* via the network 3300, data requested by the user or the client to read. For example, the application server 3100 may be implemented by a web server, a database management system (DBMS), or the like.

The application server 3100 may access a memory 3120*n* or a storage device 3150*n* included in another application server 3100*n* via the network 3300 or access one of memories 3200 to 3200*m* and storage devices 3250 to 3250*m* included in the storage servers 3200 to 3200*m* via the network 3300. By doing this, the application server 3100 may perform various operations on data stored in the application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to memories 3120 to 3120*n* of the application servers 3100 to 3100*n* via the memories 3200 to 3200*m* of the storage servers 3200 to 3200*m* or directly. The data moved via the network 3300 may be data encrypted for security or privacy.

When describing the storage server 3200 as an example, interfaces 3254-3254*m* may provide physical connections between the processors 3210-3210*m* and controllers 3251-3251*m* and physical connections between network interface cards (NICs) 3240-3240*m* and the controllers 3251-3251*m*, respectively. For example, the interface 3254 may be implemented by a direct attached storage (DAS) scheme of directly connecting to the storage device 3250 through a dedicated cable. In addition, for example, the interface 3254 may be implemented by various interfaces, such as an advanced technology attachment (ATA) interface, a SATA interface, an external SATA (e-SATA) interface, a SCSI, an SAS, a PCI interface, a PCIe interface, an NVMe interface, an Institute of Electrical and Electronics Engineers (IEEE) 1394 interface, a USB interface, an SD card interface, a multi-media card (MMC) interface, an embedded MMC (eMMC) interface, a universal flash storage (UFS) interface, an embedded UFS (eUFS) interface, and a compact flash (CF) card interface.

The storage servers 3200-3200*m* may further include switches 3230-3230*m* and the NICs 3240-3240*m*, respectively. The switch 3230 may selectively connect the processor 3210 to the storage device 3250 or selectively connect the NIC 3240 to the storage device 3250 under control by the processor 3210.

In one or more embodiments, the NICs 3240-3240*m* may include a network adaptor. The NICs 3240-3240*m* may be connected to the network 3300 by a wired interface, a wired interface, a Bluetooth interface, an optical interface, or the like. The NICs 3240-3240*m* may include an internal memory, a digital signal processor (DSP), a host bus interface, and the like and be connected to the processor 3210, the switch 3230, and/or the like via the host bus interface. The host bus interface may be implemented by one of the examples of the interface 3254 described above. In one or more embodiments, the NICs 3240-3240*m* may be integrated with at least one of the processors 3210-3210*m*, the switches 3230-3230*m*, and the storage devices 3250-3250*m*, respectively.

In one of the application servers 3100 to 3100*n* and the storage servers 3200 to 3200*m*, a processor may program or read data by transmitting a command to one of the storage devices 3150 to 3150*n* and 3250 to 3250*m* and the memories 3120 to 3120*n* and 3220 to 3220*m*. In this case, the data may be data error-corrected by an ECC engine. The data may be data bus inversion (DBI)-processed or data masking (DM)-processed data and include cyclic redundancy code (CRC) information. The data may be data encrypted for security or privacy.

The one of the storage devices 3150 to 3150*n* and 3250 to 3250*m* may transmit a control signal and a CA signal to one of NAND flash memory devices 3252 to 3252*m* in response to a read command received from the processor. Accordingly, when the data is read from one of the NAND flash memory devices 3252 to 3252*m*, a read enable (RE) signal may be input as a data output control signal such that the data is output to a DQ bus. A data strobe (DQS) may be generated using the RE signal. The command and the address signal may be latched to a page buffer according to a rising edge or a falling edge of a write enable (WE) signal.

The controllers 3251-3251*m* may control a general operation of the storage device 3250. In one or more embodiments, the controller 3251 may include static random access memory (SRAM). The controllers 3251-3251*m* may write data to the NAND flash memory devices 3252-3252*m* in response to a write command or read data from the NAND flash memory devices 3252-3252*m* in response to a read command. For example, the write command and/or the read command may be provided from the processor 3210 in the storage server 3200, a processor 3210*m* in the storage server 3200*m*, or one of processors 3110 to 3110*n* in the applications servers 3100 to 3100*n*. DRAM 3253 may temporarily store (buffer) data to be written to the NAND flash memory device 3252 or data read from the NAND flash memory device 3252. In addition, the DRAM 3253 may store metadata. Herein, the metadata is user data or data generated by the controller 3251 to manage the NAND flash memory device 3252. The storage device 3250 may include a secure element (SE) for security or privacy.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A compute express link (CXL) memory device comprising:

a high bandwidth memory (HBM) comprising a CXL base die and a plurality of core dies that are sequentially stacked on the CXL base die, wherein the CXL base die comprises an HBM controller;

a CXL interface circuit;

a bus configured to connect the HBM controller to the CXL interface circuit, and operate based on a double data rate (DDR) PHY interface (DFI) protocol; and an HBM interface intellectual property (IP) core configured to convert data transmission and reception with dynamic random access memory (DRAM) of the plurality of core dies in compliance with a CXL specification, through a direct conversion of an interface of the HBM interface IP core into the DFI protocol, and wherein the HBM interface IP core operates regardless of a Joint Electron Device Engineering Council (JEDEC) standard.

2. The CXL memory device of claim 1, wherein the HBM interface IP core further comprises:

a through silicon via (TSV) input and output (IO) block configured to process an input to and an output from the plurality of core dies; and a soft macro block configured to perform the direct conversion for complying with the DFI protocol.

3. The CXL memory device of claim 1 wherein the CXL interface circuit further comprises:

a CXL controller; and a communication interface block configured to support at least one of peripheral component interconnect express (PCIe) and universal chipset interconnect express (UCIe) communication interfaces.

4. The CXL memory device of claim 1, wherein the CXL interface circuit is configured to connect the CXL memory device to an application specific integrated circuit (ASIC) die via an interposer, and wherein the ASIC die comprises at least one central processing unit (CPU), at least one graphics processing unit (GPU), and at least one neural processing unit (NPU).

5. The CXL memory device of claim 1, wherein the CXL base die and the plurality of core dies of the HBM are stacked through a through silicon via (TSV) to form a three-dimensional (3D) memory stack.

6. The CXL memory device of claim 1, wherein the CXL base die further comprises:

a test module configured to verify a normal operation of the HBM; and a boot module configured to perform a booting process of the HBM.

7. A system-in-package (SiP) comprising:

an application specific integrated circuit (ASIC) die;

a compute express link (CXL) base die, which is vertically connected through a through silicon via (TSV), to a high bandwidth memory (HBM) comprising a plurality of core dies; and an interposer connecting the ASIC die to the CXL base die, wherein the CXL base die comprises:

an HBM controller;

a CXL interface circuit;

a bus configured to connect the HBM controller to the CXL interface circuit, and operate based on a double data rate (DDR) PHY interface (DFI) protocol; and an HBM interface intellectual property (IP) core to convert data transmission and reception with dynamic random access memory (DRAM) of the plurality of core dies in compliance with the data transmission and reception matches a CXL specification, through a direct conversion of an interface of the HBM interface IP core into the DFI protocol, and wherein the HBM interface IP core operates regardless of a Joint Electron Device Engineering Council (JEDEC) standard.

8. The SiP of claim 7, wherein the HBM interface IP core further comprises:

wherein a TSV input and output (IO) block configured to process an input to and an output from the plurality of core dies; and wherein a soft macro block configured to perform the direct conversion for complying with the DFI protocol.

9. The SiP of claim 7, wherein the CXL interface circuit further comprises:

a CXL controller; and a communication interface block configured to support at least one of peripheral component interconnect express (PCIe) and universal chipset interconnect express (UCIe) communication interfaces.

10. The SiP of claim 7, wherein the ASIC die comprises at least one central processing unit (CPU), at least one graphics processing unit (GPU), and at least one neural processing unit (NPU).

11. The SiP of claim 7, wherein the CXL base die further comprises a test module configured to verify a normal operation of the HBM; and a boot module configured to perform a booting process of the HBM.

12. A memory device comprising a high bandwidth memory (HBM) comprising a base die and a plurality of core dies that are sequentially stacked on the base die, wherein the base die comprises:

an HBM controller;

a communication interface circuit;

a bus configured to connect the HBM controller to the communication interface circuit, and operate based on a double data rate (DDR) PHY interface (DFI) protocol; and an HBM interface intellectual property (IP) core configured to convert data transmission and reception with dynamic random access memory (DRAM) of the plurality of core dies in compliance with peripheral component interconnect express (PCIe), universal chipset interconnect express (UCIe), and die-to-die (D2D) interfaces, through a direct conversion of an interface of the HBM interface IP core into the DFI protocol, and wherein the HBM interface IP core operates regardless of a Joint Electron Device Engineering Council (JEDEC) standard.

13. The memory device of claim 12, wherein the HBM interface IP core further comprises:

a through silicon via (TSV) input and output (IO) block configured to process an input to and an output from the plurality of core dies; and a soft macro block configured to perform the direct conversion for complying with the DFI protocol.

14. The memory device of claim 12, wherein the communication interface circuit connects the memory device to an application specific integrated circuit (ASIC) die via an interposer.

15. The memory device of claim 14, wherein the ASIC die comprises at least one central processing unit (CPU), at least one graphics processing unit (GPU), and at least one neural processing unit (NPU).

16. The memory device of claim 12, wherein the base die and the plurality of core dies of the HBM are stacked through a through silicon via (TSV) to form a three-dimensional (3D) memory stack.

17. The memory device of claim 12, wherein the base die further comprises:

a test module configured to verify a normal operation of the HBM; and a boot module configured to perform a booting process of the HBM.

* * * * *